Jan. 12, 1954     J. D. RUST     2,665,535
COTTON STRIPPING COMB
Filed March 14, 1952
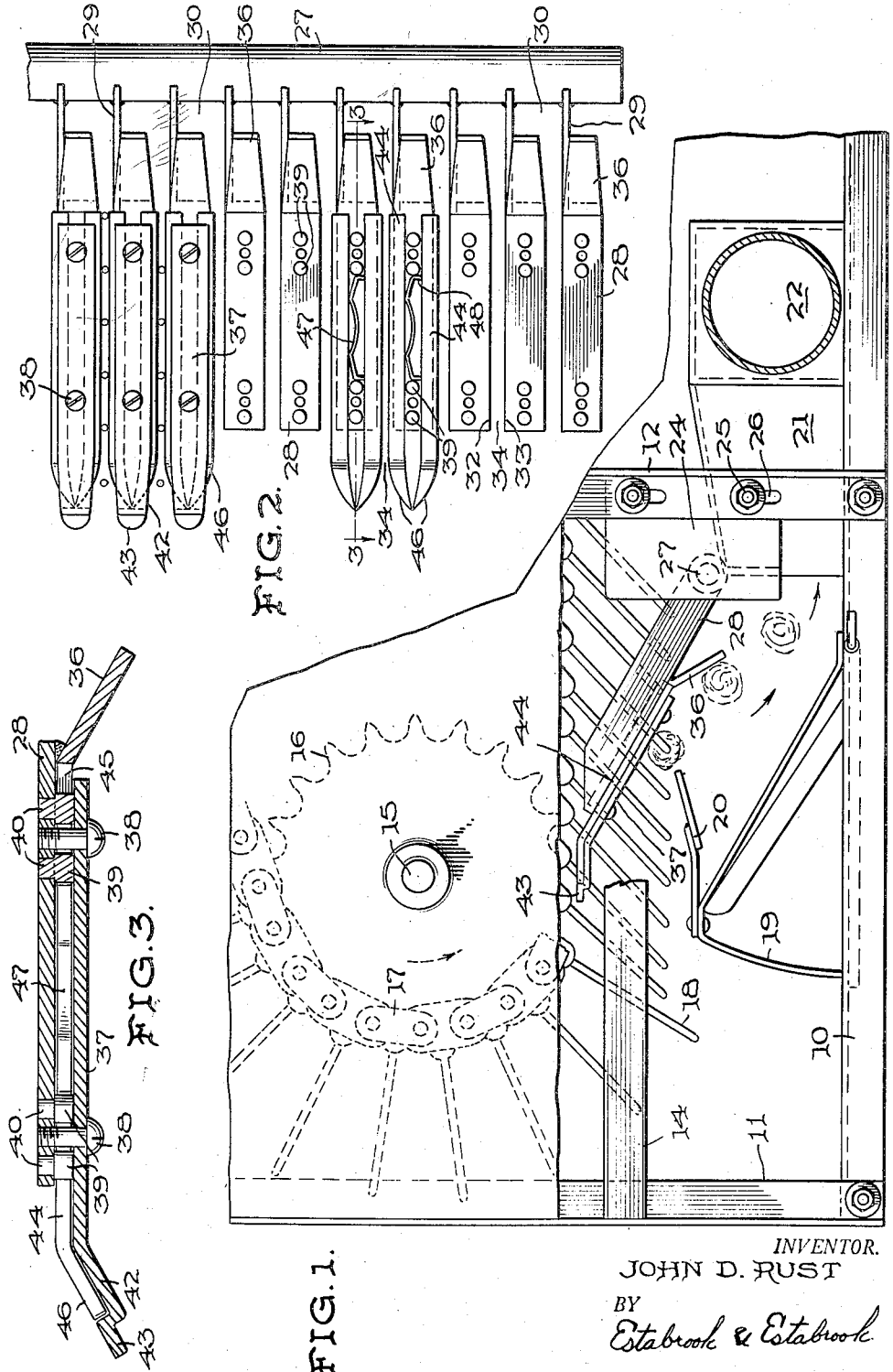
INVENTOR.
JOHN D. RUST
BY
Estabrook & Estabrook
ATTORNEYS Patented Jan. 12, 1954

2,665,535

UNITED STATES PATENT OFFICE 2,665,535

COTTON STRIPPING COMB

John D. Rust, Pine Bluff, Ark.

Application March 14, 1952, Serial No. 276,495

3 Claims. (Cl. 56—41)

The present invention relates broadly to cotton picking machines and more specifically to improvements in stripping combs for removing cotton from the picking spindles.

The present invention is an improvement over my co-pending application Serial No. 117,092, filed September 22, 1949, now Patent 2,629,221 of February 24, 1953.

It has been found from experience that in cotton stripping combs, employed heretofore, of the type embodying cotton deflector members that are carried by or formed as an integral part of the stripper bar holders that said holders are subject, under certain conditions, to being bent or deformed through the action of the spindles on the stripping bars. The bending or deforming of the stripper bar holders usually occurs near the point where the cotton deflector members are formed on or affixed to the stripper bar holders, thus the cotton deflector members could not direct the cotton away from the stripper bars and towards the suction chamber. The cotton deflector members not only serve to engage and direct the cotton away from the stripper bars, but also act as limit stop members for the stripper bars. Thus when the stripper bar holders with the cotton deflector members become bent or deformed the stripper bars would cease to function effectively.

The present invention is designed to overcome the foregoing difficulties.

One of the objects of the present invention is to provide a cotton picking unit having a cotton stripping comb with a cotton deflector member affixed thereon which engages the stripper bars for positively stopping the stripper bars from moving in the direction of travel of the cotton picking spindles.

Another object is to provide a cotton stripping comb having stripping bars formed with a curved end portion at the entrant end of the comb for guiding the spindles between the stripping bars.

Another object is to provide a cotton stripping comb having a cotton deflector member for preventing the longitudinal movement of the stripper bars and to facilitate the assembling of the stripper bars on the base member of the cotton stripping comb.

A further object is to provide a cotton stripping comb having a spring interposed between adjacent stripper bars for continuously urging said stripper bars into engagement with the spindles with the ends of the spring being formed to prevent longitudinal movement thereof between said stripper bars.

Other objects or advantages more or less ancillary to the foregoing and the manner in which all of the various objects are realized will appear in the following description, which considered in connection with the accompanying drawings sets forth the preferred embodiment of the invention.

Referring to the drawings wherein the preferred embodiment of the invention is illustrated:

Figure 1 is a top plan view of a cotton picking unit embodying the present invention, with certain parts of the unit being broken away and the suction duct shown in section;

Figure 2 is a detailed elevational view of the cotton stripping comb of the present invention with certain parts being omitted in portions of the figure in the interest of clarity; and Figure 3 is an enlarged horizontal sectional view of a cotton stripping comb, the view being taken on the plane indicated by line 3—3 of Figure 2.

Referring to the drawings, there is shown in Figure 1 a cotton picking unit having a side frame member 10 and an end frame member 11. The side frame member 10 has secured thereto a transverse frame bracing member 12, while a longitudinally extending frame bracing member 14 is secured to the end frame member 11. A driving shaft 15 mounted in suitable bearing supports, not shown, on the frame structure of the picking unit has suitable sprockets secured thereto adjacent the top and bottom end portions, with only the top drive sprocket 16 being indicated in dotted lines. The sprocket 16 on drive shaft 15 has an endless conveyor chain 17, shown in dotted lines, entrained thereabout for carrying spindle slats, not shown, which in turn have spindles 18 journaled therein. The side frame member 10 has secured thereto, by any suitable means, a bracket 19 to which is affixed, by a bolt or rivet, a baffle plate 20 for directing and guiding an air stream and the cotton into a suction chamber 21 from where it passes into the suction up take duct 22.

The transverse frame member 12 has a plate 24 adjustably mounted thereon by nuts and bolts 25 which project through suitable slots 26 formed in the transverse frame member. While only the top transverse frame member 12 is shown, it is to be understood that a transverse frame bracing member corresponding to member 12 is provided on the lower portion of the cotton picking unit frame structure, so that both the top and bottom transverse frame bracing members are adapted to have adjustable plates, such as plate 24, mounted thereon. The top and bottom plates 24, of which only the top plate is shown in Figure 1, have interposed therebetween and secured thereto, by any suitable means, a vertically extending support or post 27 which has mounted thereon one end of a plurality of superposed ribs or base members 28. The ribs 28 are formed with reduced end portions 29 which are secured to the post 27. The reduced end portions 29 of the ribs 28 are secured to the post 27 in vertically spaced relation with one another, so that the top edge of the reduced end portion 29 of one rib defines with its superjacent rib an air vent opening 30 adjacent the post 27. Each of the ribs 28 has its lower edge 32 arranged in spaced relation with the top edge 33 of the subjacent rib to define a passage 34 for the spindles 18, which passage terminates in an air vent opening 30.

The base members or ribs 28 have mounted thereon, adjacent their reduced end portions 29, a cotton deflector element or member 36, Figures 1 and 3. The cotton deflector member 36 is secured to the base member 28 and so arranged with respect to the base member 28 as to project outwardly therefrom in a diverging manner. A stripper bar holder 37 is secured to each of the base members or ribs 28 by bolts 38 which project into suitable threaded apertures formed in the ribs near their inner and outer ends. The stripper bar holders 37 and ribs 28 have interposed therebetween on opposite sides of the bolts 38 spacer lugs or projections 39. The projections 39 are formed with reduced end portions 40 which have a press fit within suitable apertures provided in the ribs 28 so that the projections 39 are disposed in aligned relation along the longitudinal axis of the ribs 28. Thus the stripper bar holders 37 are mounted on or carried by the ribs 28 through the bolts 38 and engage the projections 39 so that ribs 28 and stripper bar holders 37 are maintained in spaced relation. The stripper bar holders 37 are formed with curved outer or entrant end portions 42 which terminate in off set portions or lips 43.

Each of the ribs 28 and its corresponding stripper bar holder 37 have interposed therebetween a pair of stripping bars 44 with one of the stripping bars being disposed along one side of the projections 39 on the rib 28, while the other stripping bar is disposed along the opposite side of said projections. The inner end 45 of each stripper bar 44, Figure 3, is disposed in abutting engagement with a cotton deflector member 36 while the outer end 46 of each stripper bar is slightly curved or rounded and arranged to lie within the curved portion 42 of the stripper bar holder 37, with the curved portion 46 of the stripper bars terminating near the offset portion 43 of the stripper bar holders 37. The outer end 46 of each stripper bar 44 terminates adjacent the offset portion 43 of the stripping bar holder 37 so that said offset portion 43 and cotton deflector member 36 engage the entrant and delivery ends respectively of the stripping bars 44 and thus positively prevent the stripping bars from moving longitudinally of the rib 28. The outer or entrant end 46 of each stripper bar 44 is curved inwardly toward the longitudinal axis of the rib 28 and thus serves as guide means at the entrant end of the stripper bars for directing and guiding the spindles into the passage 34. The cotton deflector members 36 being securely anchored to the ribs 28 positively prevent the stripping bars 44 from being moved along the ribs 28 by the spindles 18 during the stripping of the cotton. Furthermore, by so mounting the cotton deflector members 36 on the ribs 28 the stripper bar holders are not susceptable of being bent or deformed through longitudinal movement of the stripping bars, which movement was caused by the travel of the spindles during the cotton stripping operation.

A spring 47, preferably of the leaf type, is interposed between the pair of stripper bars 44 on each rib 28 for continuously urging the stripper bars apart and into engagement with the spindles 18, which move through the spindle passages 34. The spring 47 is formed with curved or bent end portions 48 which engage the innermost projections 39 on the rib 28 for retaining the spring 47 in proper position between the rib 28 and stripper bar holder 37, and also between each pair of stripper bars 44. It has been found from experience that by so bending the ends of the spring it overcomes any tendency on the part of the spring to become wedged between the projections 39 and the stripper bars 44 and thus prevent the stripping bars from functioning in their proper and prescribed manner. However, by bending or curving the ends of the spring so that said bent or curved end portions have an abutting engagement with the projections 39 the spring is maintained in proper operative position for continuously urging the stripper bars 44 into engagement with the spindles 18 as they move through the passage 34. The stripper bars 44 are not rigidly clamped between the stripper bar holder 37 and rib 28 but have a free movement between said rib and holder and thus are capable of being moved apart or outwardly into the passage 34 through the action of the spring 47 for continuously engaging the spindles 18.

In the operation of the present invention the spindles 18, having removed the open cotton from the cotton bolls and which cotton is wrapped about the spindles 18, are moved through the cotton stripping comb structure by the conveyor chain 17. As the spindles 18 are brought into alignment with the spindle passages 34, in the cotton stripping comb structure, the curved outer end portions 46 of the stripping bars 44 guide the spindles into the passages 34. As the spindles move through the passages 34 and between the stripper bars 44 the cotton is gradually drawn toward the tips of the spindles 18 due to the angular positioning of the cotton stripping comb with respect to the line of travel of the spindles 18 on the conveyor 17. As the cotton is stripped from the ends or tips of the spindles 18, Figure 1, it engages the outwardly diverging cotton deflector members 36 which direct the cotton into the air stream indicated by arrows in Figure 1, created by a suction fan, so that the cotton is drawn into the suction chamber 21 and thence into the suction duct 22 from where it is delivered to a suitable receptacle. The suction created in the suction chamber 21 draws currents or streams of air through the air vent openings 30, which air streams flow over and around the cotton deflector members 36 and thus carry the cotton into the suction chamber 21.

I claim:

1. In a cotton picking unit wherein stripping means is provided through which cotton picking spindles are drawn to free the cotton from the spindles, the improvement which includes a support, a plurality of superposed ribs secured to said support, said ribs being formed with a reduced end portion adjacent said support and defining with respect to the subjacent rib an air vent opening, said ribs having an edge arranged in spaced relation with a subjacent rib and defining a spindle passage terminating in said air vent opening, a cotton deflector member secured to each rib adjacent said reduced end portion, a stripping bar holder secured to each rib in spaced parallel relation therewith, a pair of stripping bars positioned between each of said ribs and holders, said stripping bars having an end thereof disposed in abutting engagement with said cotton deflector member to prevent said stripping bars from moving in one direction along said ribs, and resilient means positioned between the bars of each pair of stripping bars for continuously urging said bars in yielding contact with the spindles.

2. In a cotton picking unit wherein stripping means is provided through which cotton picking spindles are drawn to free the cotton from the spindles, the improvement which includes a support, a plurality of superposed ribs secured to said support, each of said ribs being formed with a reduced end portion adjacent said support and defining with respect to the subjacent rib an air vent opening, said ribs having an edge arranged in spaced relation with a subjacent rib and defining a spindle passage terminating in said air vent opening, a cotton deflector member secured to each rib adjacent said reduced end portion, a plurality of spaced lugs affixed to each rib, a stripper bar holder supported on the lugs on each rib, means securing said stripper bar holder to each rib, a pair of stripping bars positioned between each of said ribs and holder, said stripping bars having an end in abutting engagement with said cotton deflector member to prevent said stripping bars from moving in one direction along said ribs, a spring positioned between the bars of each pair of stripping bars for continuously urging said bars in yielding contact with the spindles, the ends of said spring being bent and disposed in abutting engagement with a pair of said lugs for retaining said spring in proper position between said stripping bars, rib and holder.

3. In a cotton picking unit wherein stripping means is provided through which cotton picking spindles are drawn to free the cotton from the spindles, the improvement which includes a support, a plurality of superposed ribs secured to said support, each of said ribs being formed with a reduced end portion adjacent said support and defining with respect to the subjacent rib an air vent opening, said ribs having an edge arranged in spaced relation with a subjacent rib and defining a spindle passage terminating in said air vent opening, a cotton deflector member secured to each rib adjacent said reduced end portion, a plurality of spaced lugs affixed to each rib, a stripper bar holder supported on the lugs on each rib, means securing said stripper bar holder to each rib, a pair of stripping bars positioned between each of said ribs and holders, said stripping bars having entrant and delivery ends, the delivery ends of said stripping bars being disposed in abutting engagement with said cotton deflector member to prevent said stripping bars from moving in one direction along said ribs, the entrant end of said stripping bars being curved for guiding the spindles into said spindle passage, a spring positioned between the bars of each pair of stripping bars for continuously urging said bars in yielding contact with the spindles, the ends of said spring being bent and disposed in abutting engagement with a pair of said lugs for retaining said spring in proper position between said stripping bars, rib and holder.

JOHN D. RUST.

References Cited in the file of this patent

UNITED STATES PATENTS

| Number | Name | Date |
|---|---|---|
| 1,946,741 | Hamme | Feb. 13, 1934 |
| 2,058,514 | Rust et al. | Oct. 27, 1936 |
| 2,629,221 | Rust | Feb. 24, 1953 |